United States Patent [19]

Shirkhan

[11] Patent Number: 4,830,218

[45] Date of Patent: May 16, 1989

[54] FLOW COMPENSATED PUMP

[75] Inventor: Hamid Shirkhan, Watertown, Mass.

[73] Assignee: Fluid Management Systems, Watertown, Mass.

[21] Appl. No.: 6,954

[22] Filed: Jan. 27, 1987

[51] Int. Cl.⁴ .............................................. B67D 5/08
[52] U.S. Cl. ..................................... 222/52; 318/685; 604/67
[58] Field of Search ...................... 222/52, 14, 57, 71, 222/63; 318/445, 676, 685, 644; 604/65, 67; 128/DIG. 13, DIG. 12; 137/624.11, 624.27

[56] References Cited

U.S. PATENT DOCUMENTS

| | | | |
|---|---|---|---|
| 3,736,930 | 6/1973 | George | 128/214 E |
| 4,299,218 | 11/1981 | Kniggi et al. | 604/67 |
| 4,468,219 | 8/1984 | George et al. | 604/67 |
| 4,489,260 | 12/1984 | Matsushita | 318/685 |

Primary Examiner—Kevin P. Shaver
Assistant Examiner—Kenneth Noland
Attorney, Agent, or Firm—Weingarten, Schurgin, Gagnebin & Hayes

[57] ABSTRACT

A controlled fluid delivery system comprising a pump and electric drive apparatus which provides precise metering of the fluid, and includes an error correction apparatus by which the system errors may be compensated and calibrated to provide a precisely controlled fluid flow at a continuous speed or small quantities of the fluid by intermittent system operations. Furthermore, the apparatus is modular and may accommodate a variety of mechanical pumps. The controlled fluid delivery system communicates with other apparatus such as measurement devices and process control equipment through standard binary communication lines.

11 Claims, 8 Drawing Sheets

FIG. 11A ered pump, and the tracking of the control signal provided by the keyboard. The controlled flow rate is determined by an input frequency that is transformed to a control frequency which governs the motor drive.

FLOW COMPENSATED PUMP

FIELD OF THE INVENTION

The present invention relates to fluid pumps and, in particular, controlled fluid delivery systems having mechanical pumps controlled by precision compensated electronic means to provide precisely metered fluid delivery.

BACKGROUND OF THE INVENTION

Previous fluid delivery systems using pumps provide a metered flow of fluid. Typically, the pumps are driven by a DC drive motor which receives a variable DC drive level to provide the desired rotational velocity to the pump. The flow of fluid is generally determined after a period of time necessary to allow the flow to stabilize. Once the flow is measured, the rotational speed of the motor driving the pump is adjusted to provide the desired flow. Therefore, the system requires many rotations of the pump and the flow measurement to allow for a measurement of flow from which the system is adjusted. However, this manner of measuring flow results is often insufficient for precise chemical processes or for the metering of small quantities of fluid.

SUMMARY OF THE INVENTION

The apparatus according to the present invention provides a precise delivery of fluid to provide accurately metered flow rate or volume of almost any desired quantity of the fluid. The system is adaptable to accommodate a variety of mechanical pumps, such as peristaltic, and is driven by an DC stepper motor under software control to provide a selectively varied energization frequency and current to the stepper motor. The energization signal is adjusted by a microprocessor to provide a flow rate which has been entered as a remotely generated digital signal or signal entered via a front panel key pad. Furthermore, the software control system respond to calibration signals determined according to three alternate calibration methods and provides internal correction signals to overcome system errors which show up as a difference between the selected flow (or volume) and the actual flow (or volume). The system according to the present invention communicates to the calibration equipment as well as to external process control equipment by standard data communication protocol.

BRIEF DESCRIPTION OF THE DRAWING

These and other features according to the present invention will be better understood by reading the following detailed description, taken together with the drawing wherein.

DETAILED DESCRIPTION OF THE INVENTION

Figure 1:
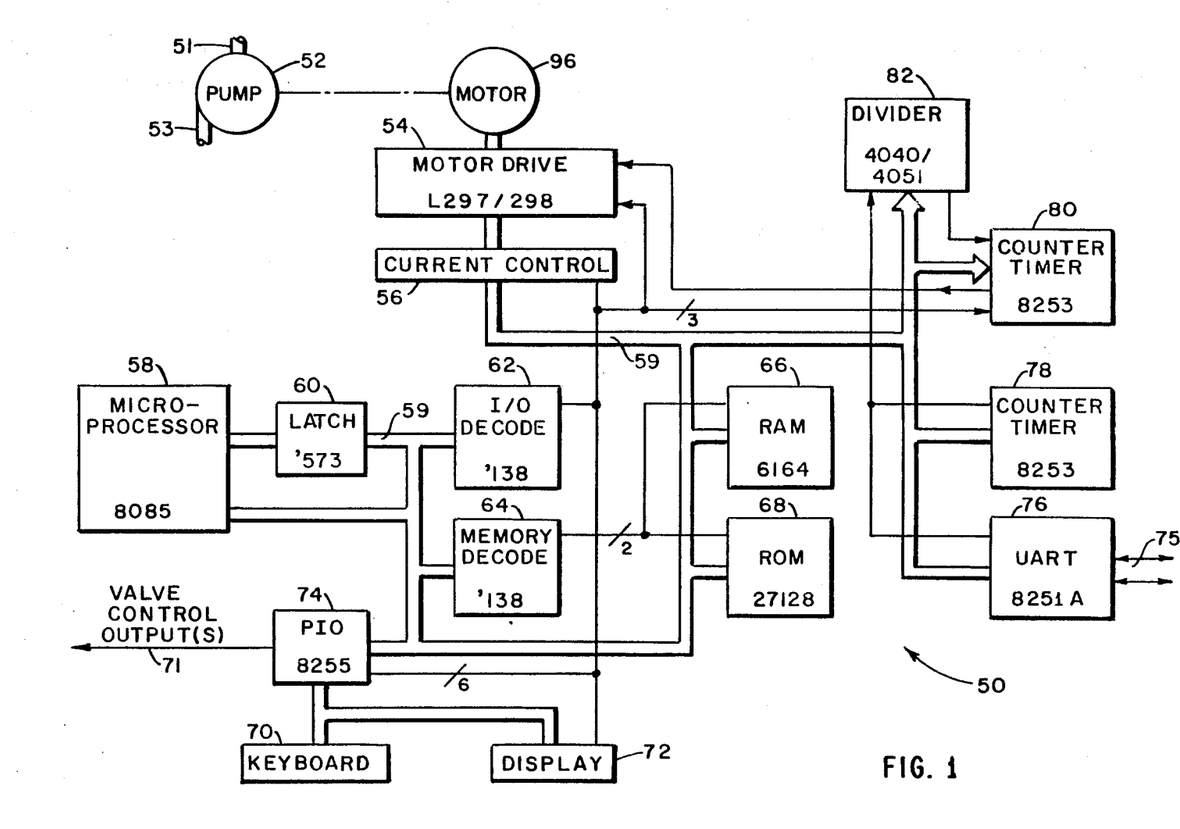
FIG. 1 is a block diagram of the system according to the present invention.

A system block diagram 50 is shown in FIG. 1 wherein the pump 52 and motor 96 is controlled by a motor drive 54; the pump 52 receives the fluid by an input at 51 and provides the flow output at 53. The motor drive 54 is controlled by a frequency supplied by counter timer 80 and current control circuit 56 according to the microprocessor 58, such as part number 8085, manufactured by Intel, which provides data on the system bus 59 and address signals on the system bus 59 via latch 60. The current control circuit 56 is enabled by a signal from the I/O decode circuit 62 which receives signals from the system bus 59. The divider circuit 82 and the frequency control circuit 80 are enabled by a signal from I/O decode circuit 62. The I/O decode circuit 62 also provides enable signals to other input/output elements discussed below. A memory decode circuit 64 provides memory enable signals to the random access memory (RAM) 66 and the read only memory (ROM) 68, also connected to the system bus 59.

Peripheral input/output devices such as keyboard 70, valve output 71, and display 72 are controlled by the peripheral input/output (PIO) element 74. The valve (not shown) controlled by the valve output 71 is connected to one port of the pump 52 to block fluid flow or direct fluid flow along one or more fluid paths. The PIO circuit is enabled by the I/O decode circuit 62 and receives signals from the system bus 59. The display 72 provides information and decision prompts to the operator, as discussed with regard to the option and process selection steps, discussed below. The operator responds to the information and prompts and provides the selected flow of data to the system 50 via keyboard 70, whose signals are received by the PIO element 74 and the microprocessor 58.

Periodic signals provided within the system, such as the motor drive signals and time interval signals, are provided by the counter timer elements 78 and 80, also connected to the system bus 59. The counter timer 80 works in conjunction with the divider 82. The microprocessor 58 may also provide the periodic signals.

Communication to external process control computers and to calibration elements such as scales and other measuring devices is provided over leads 75 through UART 76, enabled by the I/O decode circuit 62, and providing signals over the system bus 59.

Figure 2:
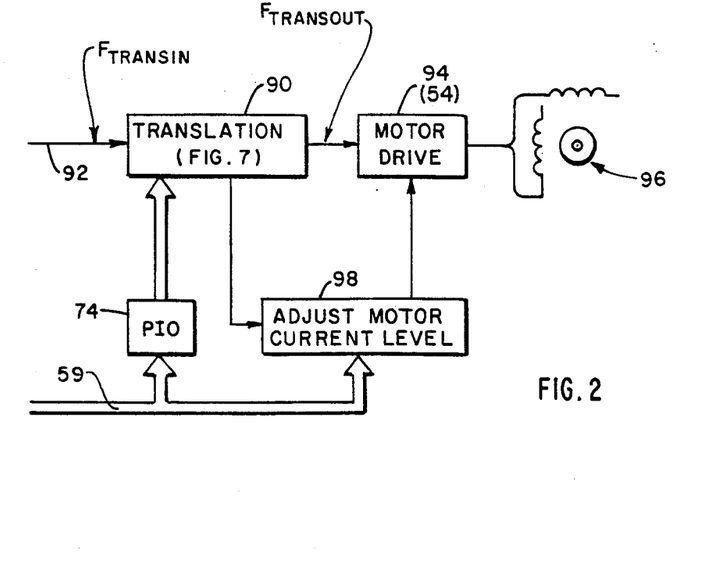
FIG. 2 is a block diagram of a portion of the system motor drive components in FIG. 1.

The interaction between the frequency and control circuit 56 in the microprocessor 58 control system is shown in greater detail in FIG. 2. A translation process 90 receives an input frequency $F_{trans}$ in, at 92 from the counter timer 80 and receives control from PIO 74. The translation circuit provides an output frequency used to drive the motor drive circuitry. The actual formula used to produce the output formula is as follows:

$$F_{out \text{ (software)}} = \text{flow rate} * \text{compensation factor} * \text{tubing I.D. compensation} * K \quad (1)$$

where compensation factor=nominal value/actual value, determined in the calibration process. The parameter K varies depending upon the utilized drive method (for example): with a 1.8° stepper motor, using one-half a step drive technique, K=6.6667 (Step/(RPM)). Also, to obtain this frequency ($F_{out}$) in hardware, a dividing factor, D, must be obtained. This can be calculated with the following formula:

$$D = \frac{F_{in} \text{ (software)}}{F_{out} \text{ (software)}} \quad (2)$$

where $F_{in}$=main input frequency and $F_{out}$=compensated frequency as described above (equation 2); therefore $$F_{out} \text{ hardware} = F_{trans}\text{in} = \frac{F_{in} \text{ (hardware)}}{D} \quad (3)$$

The software notes mean the values used in software to calculate the result(s). the hardware notes are the actual values that exist in the circuitry, as can be measured with electronic equipment.

Figure 3:
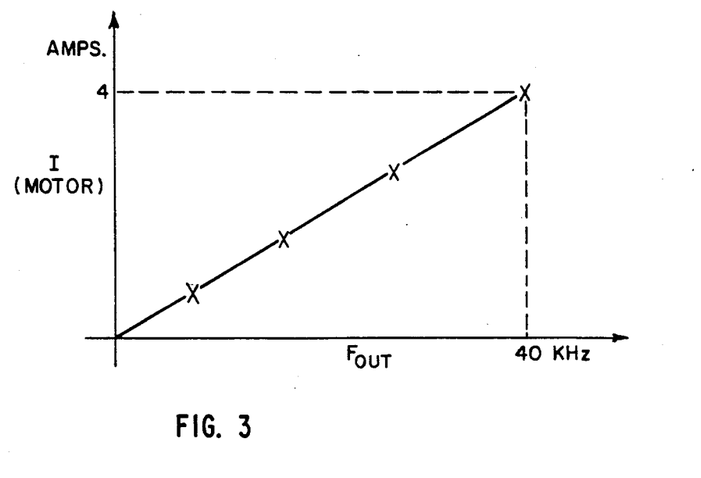
FIG. 3 is a curve showing the appropriate motor drive current with respect to the pump motor drive frequency.

The resulting $F_{trans}$out frequency is received by a drive circuit 94 which provides the signal to selectively energize the individual windup of the DC stepper motor 96. The energization levels are monitored and controlled by a current level circuit 98 which produces a drive current control which is consistent with both the drive frequency and the inductance of the motor windings, by previously stored information and current sense information provided from the motor drive circuitry. In the preferred embodiment, a piecewise linear curve, FIG. 3, shows a relationship of current (A) to drive frequency.

Figure 4:
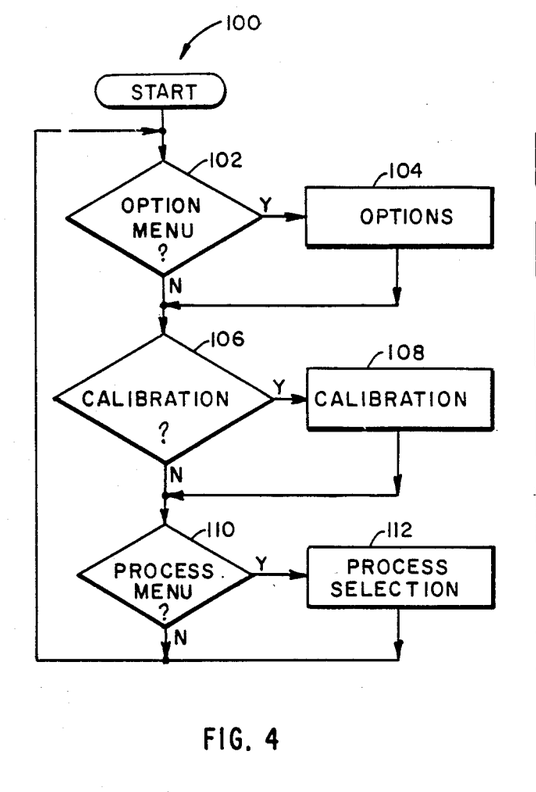
FIG. 4 is a flow chart of the overall system of sequence of operation.
Figure 5:
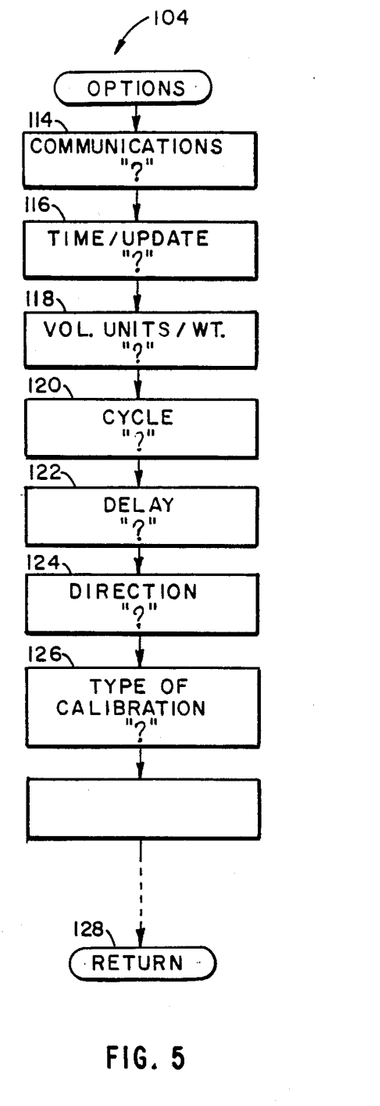
FIG. 5 is a flow chart of the option selection sequence shown in the flow chart of FIG. 4.

The overall system operation is described by the flow chart 100 of FIG. 4. When the system is initialized, an option menu appears at the display 72 (FIG. 1. If the menu is selected, the options, subroutine 104, discussed in FIG. 5 is selected. If not, or after the options are selected, the calibration process may be selected at 106. If it is selected, the calibration subroutine 108 begins. If calibration is not selected or the calibration is completed, the process menu is selected at 110. If the process menu is selected, the process selection subroutine 112 begins. If the process menu is not selected, or the process section is completed, the system is restarted and re-enters the selection at 102.

The options subroutine includes the display of a communications prompt at 114 and the entry of the appropriate communications directive into the keyboard 70. Similarly, the time/date is requested at 116 to be entered by the keyboard 70. The volume units/weight prompt is provided at 118 and awaits a response into the keyboard 72 by the operator. A cycle choice prompt is provided at 120, to which the user provides a cycle select, discussed below. Similarly, delay in system process is selected in response to the prompt at 122, and a direction is specified in response to the prompt at 124. Further system information is provided in response to prompts such as the request for the type of calibration at 126. The system is operative according to the returned operator information and returns to the program of FIG. 4.

Figure 6:
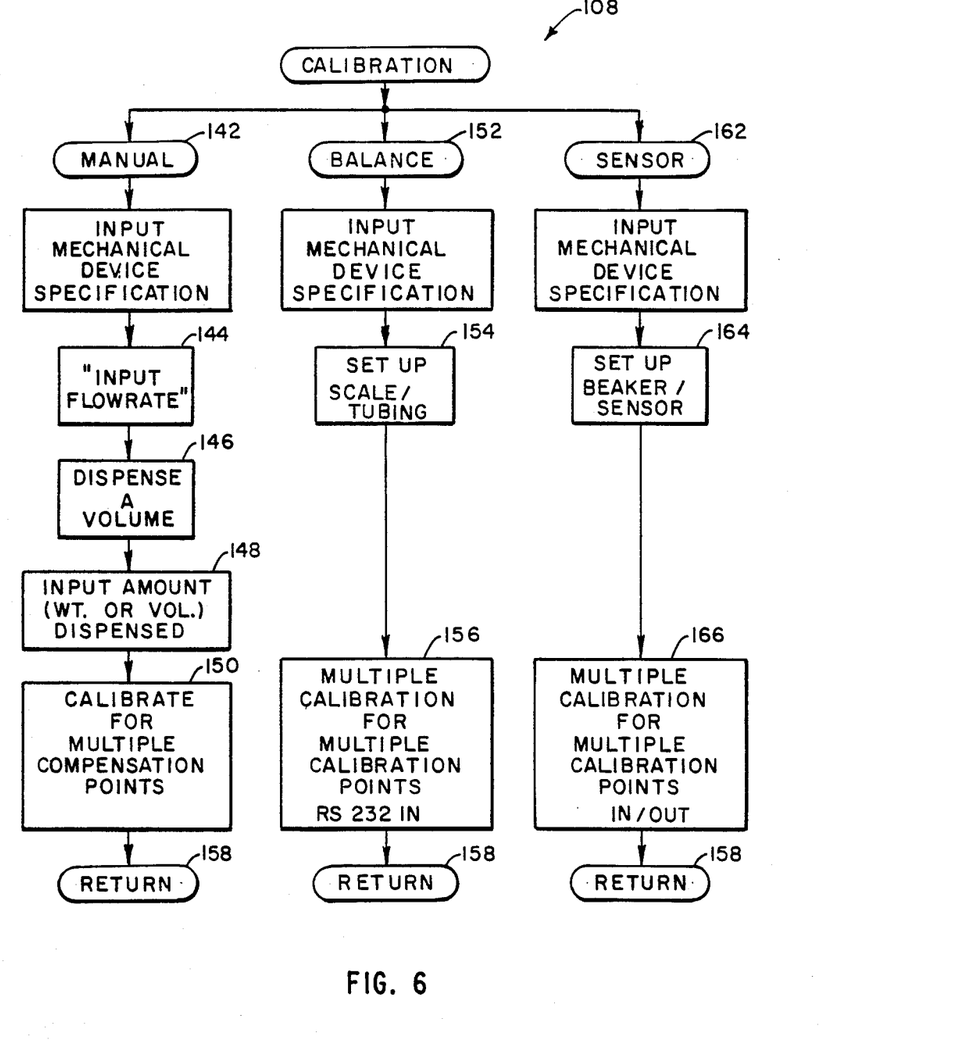
FIG. 6 is a flow chart showing the calibration sequence of the flow chart of FIG. 4.

The calibration process of FIG. 4 is shown in greater detail in FIG. 6. According to the type of calibration in response to the prompt 126 of FIG. 5, one of three types of calibration, including manual 142, balance 152 and sensor 162 calibration is begun. The manual calibration process includes a input prompt for tubing ID (tubing ID=ideal characteristic of tubing) with a peristaltic pump, stroke length with a piston pump, and a flow rate to which the user provides input through the keyboard. Similarly, the prompt output volume is provided at 146 to which the operator provides the requested information. The amount of solution dispensed is requested by the prompt at 148 to which the operator provides the appropriate information. Thereafter, the system uses the approximation method in manual calibration only to calculate the calibration values based on one or more data points at 150, discussed in greater detail with regard to FIG. 7. The approximation method may require one or more compensation calculations. Thereafter, a system return 158 causes the system to re-enter at 110 in FIG. 4. If the balance calibration process is selected, information corresponding to the balance and/or tubing ID, parameters are requested at 154, to which the operator provides the corresponding information. The calibration process occurs next at step 156 wherein one or more calibration data points are provided by reading the balance via the communication data lines connected to the UART 76. The process of 156 provides for different flow rates for different time intervals, and the system is calculated to be correct at the end of each time interval for a measure of weight.

The sensor calibration process 162 requires a beaker/sensor set up at 164, and the calibration process 166 provides multiple calibration compensation points wherein a pipette with a multiple level sensor is connected wherein the time is measured between the pipette volume sensor markers.

Figure 7:
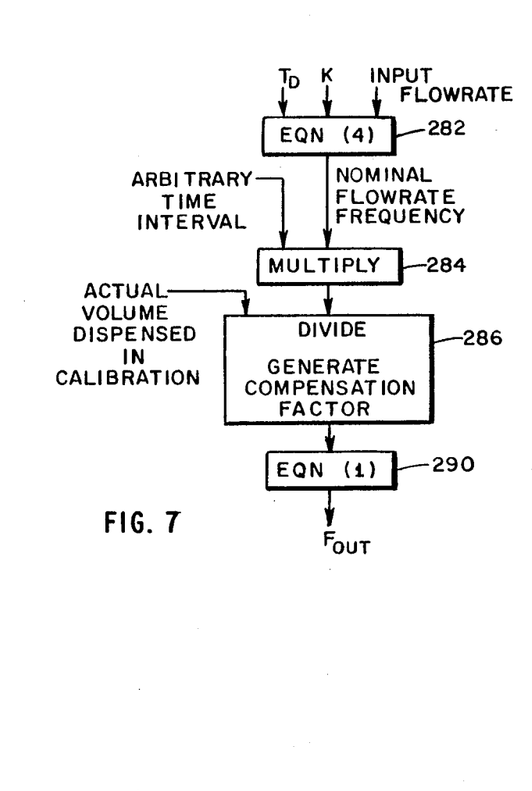
FIG. 7 is a flow chart showing the calibration process of the flow chart of FIG. 6.

A more detailed description of the calibration process is shown in FIG. 7. The value signal, ID, corresponding to the ideal relationship between the flow rate of the commercial pump and the RPM, and the selected flow rate is combined according to $$\text{Nominal Flow rate frequency} = \text{input flow rate} * \text{tubing ID compensation} * K \quad (4)$$

(where K is previously described) at 282, providing a nominal flow rate frequency signal. The nominal flow rate signal is multiplied with a nominal time period signal at 284, to provide a nominal volume signal. The nominal volume signal is compared to the actual volume dispensed in the calibration process at 286, providing a compensation factor. The compensation factor is the factor which determines the relationship between an ideal system and the actual system, including system errors and tolerances. Calibration is determined through the following formula:

$$\text{compensation factor} = \text{nominal volume/actual volume} \quad (5)$$

except for the electronic sense calibration procedure, wherein the calibration factor will be:

$$\text{compensation factor} = \text{nominal time}/\text{actual time} \quad (6)$$

The compensation factor, input flow rate data and main frequency $F_{in}$ are combined at 290 to provide divider factors of equation (2) which are values used to produce the required motor drive frequency. The divider factors are calculated by microprocessor 58 and stored in RAM 66 and result from a best fit selection of the signals provided from the operator and the calibration signals such that the desired output frequency will produce the least amount of error between the desired flow rate and the actual flow rate. The divider factors are produced through frequency dividing and generating circuitry. The $F_{out}$ signal is provided according to equation (1), discussed above.

Figure 8:
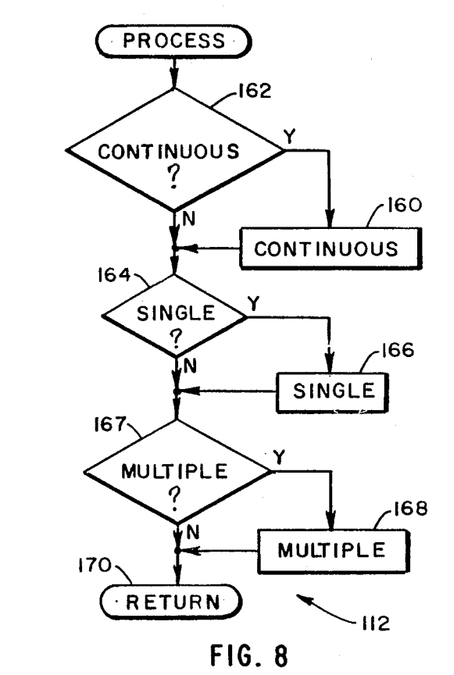
FIG. 8 is a flow chart showing the process selection sequence of the flow chart of FIG. 4.

The process selection step of FIG. 4 is shown in greater detail in FIG. 8 wherein a continuous process may be selected at 162. If it is selected, the continuous process subroutine begins at 160. If it is not chosen, or if the process 160 is concluded, a single process may be selected at 164. If a single process is selected, a single process subroutine 166 is begun. If the single process is not selected or if the single process 166 has concluded, a multiple process may be selected at 167. If the multiple process is selected, the multiple process subroutine 168 is begun. If the multiple process is not selected, or if it is completed, the system returns at 170.

Figure 9:
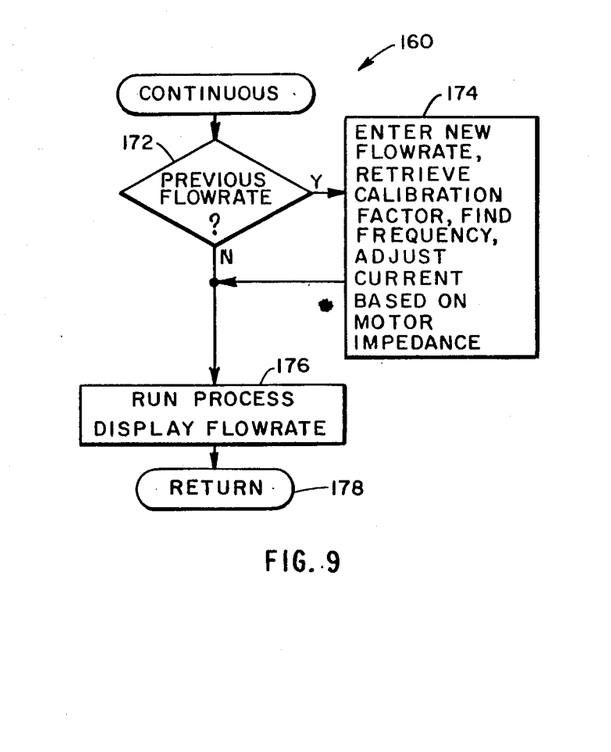
FIG. 9 is a flow chart showing the continuous flow process of FIG. 8.

The continuous process 160 is shown in greater detail in FIG. 9. A flow rate may be chosen at 172, wherein a new flow rate is entered at 174, and the system that retrieves a calibration factor, finds an appropriate frequency and adjusts the motor current based on the drive frequency and the impedance of the motor. The selection of the current is provided according to a curve (FIG. 3) based on five piecewise linear sections of an approximation relationship between the motor velocity (frequency) and impedance. Next, the process is run at 176 and the flow rate is displayed on the display 72. Depressing the stop key will return the system at 178.

Figure 10:
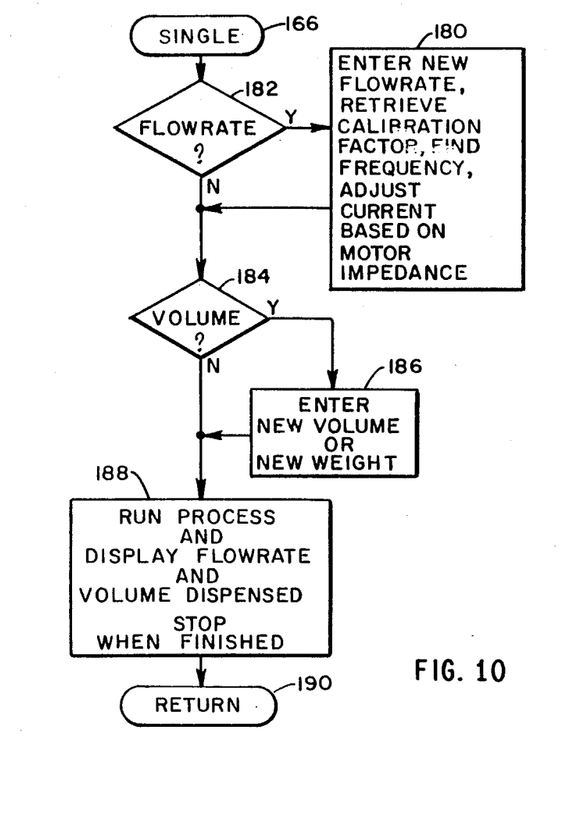
FIG. 10 is a flow chart showing the single-step process of the flow chart of FIG. 8.

A single step process 166 is shown in greater detail in FIG. 10. A flow rate may be chosen at step 182 wherein the new flow rate is entered, the calibration factor retrieved and a motor frequency determined at 180. Moreover, the motor drive current is adjusted based on the drive frequency and the impedance of the motor, as discussed previously with regard to step 174. Next, the system volume may be selected at 184. If it is elected to enter a new volume, the information is added at step 186. Subsequently, the process is run and the flow rate and volume dispensed is displayed in the display 72. Thereafter the system stops and returns at 190.

Figure 11:
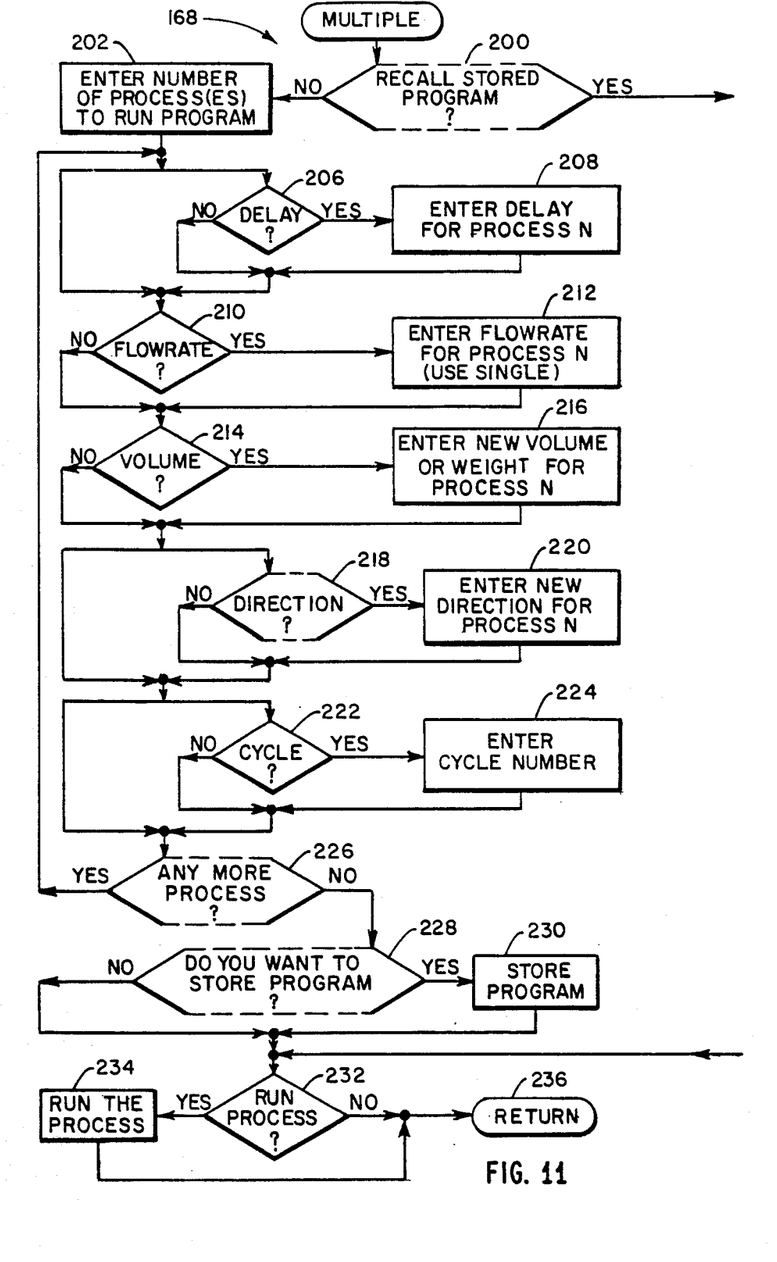
FIG. 11 and FIG. 11a are flow charts showing the multiple sequence routine of FIG. 8.

Multiple sequence operation 168, is shown in greater detail in FIG. 11, wherein a previously stored program of a pump operational sequence may be recalled at step 200. If the stored program is not recalled, the number of processes to run in the program is entered at 202. Next, a delay may be selected at 206, which if selected receives a delay signal entered at 208. Thereafter, a flow rate may be selected at 210, which if selected is entered at 212. Subsequently, the volume may be selected at 214, which if selected is entered at 216 and comprises a new volume or weight for that step of the process. Subsequently, the direction of flow and the valve number may be selected at 218, which if selected is entered at step 220. Subsequently, the number of cycles may be entered at step 224 if elected at 222. The system interrogates the operator if any additional processes are desired at 226. If more processes are to be performed, the system begins the next set of instructions corresponding to a subsequent process operation at 206. If no more process sequences are desired at 226, the system will store the program at 230 if elected at 228. Subsequently, the system may run the process at 234 if elected at 232. Thereafter, the system returns to the calling program.

Figure 11A:
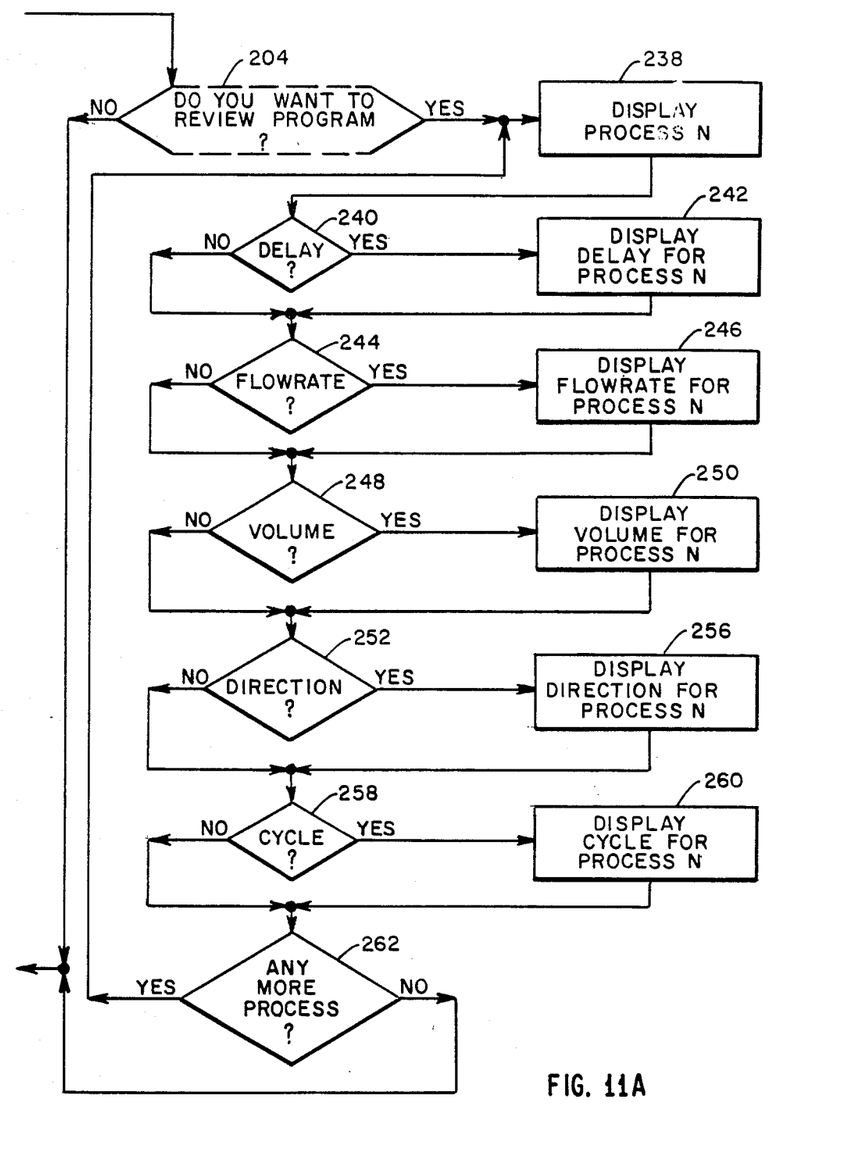

If the previously stored program is recalled at 200, the operator may review the stored program is elected at 204. If not, the process may be run if elected at 232. However, if the process is reviewed, the particular process is displayed at step 238. This includes the display of the process delay 242 if elected at 240. Similarly, if elected at 244, the flow rate may be displayed at 246. Furthermore, if elected at 248, the volume for the process may be displayed at 250. Similarly, the direction of the system and valve number may be displayed at 256 if elected at 252. The cycle number may be displayed at 260 if elected at 258. The subsequent process sequences may be displayed if elected at step 262, otherwise the process sequences may be run if elected at step 232.

In addition to the system flow calculations, the present invention includes a system failure detector which provides an alarm upon failure of the pump or the drive motor. This system failure detector may comprise a shaft rotation sensor or flow sensor connected to a suitable alarm components, and powered by independent power supply if desired.

The above software may be implemented by the language or code appropriate to the microprocessor 58 selected. Modifications and substitutions to the system of the present invention made by one skilled in the art are considered to be within the scope of the present invention, which is not to be limited except by the claims which follow:

What is claimed is:

1. A controlled fluid delivery system, comprising:
    a pump providing a predetermined delivery of fluid between an input and an output through connecting tubing;
    electric pump drive means connected to said pump to provide said predetermined delivery of fluid according to a control signal;
    control means providing said control signal according to a desired flow rate; and
    error correction means providing a correcting signal to said control means in response to said desired flow rate and a measured corresponding flow, including at least one of a tubing ID compensation factor and a calibration factor derived from pump calibration,
    wherein said control signal corresponds to a signal derived from the product of the input flow rate, a pump motor parameter and at least one of said tubing ID compensation factor and said calibration factor.

2. The controlled fluid delivery system of claim 1, further including
    means to communicate with a process control system, wherein control of the controlled fluid delivery system is provided by the process control system.

3. The controlled fluid delivery system of claim 1, wherein said error correction means includes calibration means providing multiple calibration signals at corresponding calibration points and interpolated correction signals between said calibration points.

4. The controlled fluid delivery system of claim 1, wherein said electric pump drive means comprises a DC stepper motor.

5. The controlled fluid delivery system of claim 1, further including display means for providing a display of at least one of a system parameter request prompts and system parameter values.

6. The controlled fluid delivery system of claim 1, wherein said pump comprises an interchangeable pump head.

7. The controlled fluid delivery system of claim 6, wherein said pump comprises one of a peristaltic pump and piston pump.

8. The controlled fluid delivery system of claim 1, further including valve control means to provide a valve control signal for selecting a fluid path relative to said pump.

9. A controlled fluid delivery system, comprising:
   a pump providing a predetermined delivery of fluid between an input and an output through connecting tubing:
   electric pump drive means connected to said pump to provide said predetermined delivery of fluid according to a control signal;
   control means providing said control signal according to a desired flow rate; and
   error correction means providing a correcting signal to said control means in response to said desired flow rate and a measured corresponding flow, including at least one of a tubing ID compensation factor and a calibration factor derived from pump calibration; and
   means to communicate with a process control system, wherein control of the controlled fluid delivery system is provided by the process control system, wherein said control signal corresponds to a signal derived from the product of the input flow rate, a pump motor parameter and at least one of said tubing ID compensation factor and said calibration factor, and
   wherein the operator manually enters calibration data into said controlled fluid delivery system, and said calibration compensation factor is calculated by said error correction means, wherein said calibration data comprises specific numeric values related to at least one.

10. A controlled fluid delivery system comprising:
    a pump providing a predetermined delivery of fluid between an input and an output through connecting tubing;
    electric pump drive means connected to said pump to provide said predetermined delivery of fluid according to a control signal;
    control means providing said control signal according to a desired flow rate; and
    error correction means providing a correcting signal to said control means in response to said desired flow rate and a measured corresponding flow, including at least one of a tubing ID compensation factor and a calibration factor derived from pump calibration; and
    means to communicate with a process control system, wherein control of the controlled fluid delivery system is provided by the process control system, wherein
    said control signal corresponds to a signal derived from the product of the input flow rate, a pump motor parameter and at least one of said tubing ID compensation factor and said calibration factor, and wherein
    said error correction means includes means for communicating to measuring devices including at least one of a balance scale and a volumetric measuring device, wherein
    said error correction means automatically calculates said calibration factor in response to signals provided by the measuring devices.

11. A controlled fluid delivery system, comprising;
    a pump providing a predetermined delivery of fluid between an input and an output through connecting tubing;
    electric pump drive means connected to said pump to provide said predetermined delivery of fluid according to a control signal;
    control means providing said control signal according to a desired flow rate; and
    error correction means providing a correcting signal to said control means in response to said desired flow rate and a measured corresponding flow, including compensation for the impedance characteristics of said electric pump drive means, wherein
    said impedance characteristic is approximated by a piecewise linear curve of the pump drive means impedance characteristic versus drive frequency, and wherein
    said control means includes drive current control means to adjust the drive current of said electric pump drive means according to said impedance characteristic.

* * * * *